United States Patent [19]

Gill

[11] Patent Number: 5,060,691

[45] Date of Patent: Oct. 29, 1991

[54] COMPACT MULTI-STAGE PRESSURE REDUCING VALVE

[76] Inventor: Ajit S. Gill, 4169 Bennion Rd., Salt Lake City, Utah 84119

[21] Appl. No.: 511,579

[22] Filed: Apr. 20, 1990

Related U.S. Application Data

[63] Continuation-in-part of Ser. No. 340,898, Apr. 19, 1989, Pat. No. 4,967,793, which is a continuation-in-part of Ser. No. 167,861, Mar. 14, 1988, abandoned.

[51] Int. Cl.$^5$ ............................................. F16K 31/44
[52] U.S. Cl. .................................. 137/613; 251/249.5; 251/282
[58] Field of Search ................ 251/248, 249.5, 61.1, 251/282; 137/613, 219, 557, 599

[56] References Cited

U.S. PATENT DOCUMENTS

| | | | |
|---|---|---|---|
| 4,0195,533 | 4/1977 | Jerde et al. ............................. | 137/599 |
| 1,441,784 | 1/1923 | Clayton ................................. | 137/330 |
| 2,010,416 | 8/1935 | Schlagenhauff ....................... | 137/219 |
| 2,265,435 | 12/1941 | Kinzie et al. .......................... | 137/139 |
| 2,315,797 | 4/1943 | Kinzie ................................... | 251/248 |
| 2,470,744 | 5/1949 | Korn ..................................... | 137/613 |
| 2,878,827 | 3/1959 | Johnson et al. ........................ | 251/248 |
| 2,881,687 | 4/1959 | Manor .................................. | 98/1 |
| 2,970,806 | 2/1961 | Rexford et al. ....................... | 251/210 |
| 3,312,241 | 4/1967 | Bryant ................................. | 137/599 |
| 3,490,379 | 1/1970 | Laing .................................. | 417/420 |
| 4,372,334 | 2/1983 | Paul Jr. ................................ | 137/613 |
| 4,519,411 | 5/1985 | Takahashi ............................. | 137/219 |

FOREIGN PATENT DOCUMENTS 524859 12/1953 France .............................. 251/248

OTHER PUBLICATIONS

Cla-Val Co. Product Data Catalog, Cla-Val Co., pp. 14 and 15, 5/1971.
"Brochure for Control Valves", The Roll Seal Valve Company, Inc., Temecula, CA 7/1989.

Primary Examiner—A. Michael Chambers
Attorney, Agent, or Firm—Mallinckrodt & Mallinckrodt

[57] ABSTRACT

A flow control and pressure reducing valve has a valve body with an inlet chamber and outlet chamber separated by a partition plate. A plurality of passages are formed in the valve body spaced circumferentially around the partition plate and have an inlet portion opening into the inlet chamber and an outlet portion opening into the outlet chamber. Elastomeric flow control means are positioned in the passages and are responsive to pressurized fluid introduced therein to control flow of fluid through the passages around the partition plate. The valve configuration allows the mounting of inlet and outlet gates within the inlet and outlet chambers to eliminate the need for separate gate valves. An auxiliary flow passage may be provided through the partition plate an flow controlled therethrough to increase the flow capacity of the valve yet still provide full flow and pressure control. Air inlet and relief valves may also be provided as an integral part of the valve.

26 Claims, 10 Drawing Sheets

COMPACT MULTI-STAGE PRESSURE REDUCING VALVE

RELATED APPLICATIONS

This is a continuation-in-part of my copending application Ser. No. 07/340,898, filed Apr. 19, 1989, now U.S. Pat. No. 4,967,793, issued Nov. 6, 1990, which is a continuation-in-part of application Ser. No. 07/167,861, now abandoned.

BACKGROUND OF THE INVENTION

1. Field

The invention is in the field of flow control and pressure relief valves for controlling the flow of fluid through a pipe line.

2. State of the Art

Various types of valves are currently in use to control the flow of fluids through a pipe line and to reduce the pressure of a fluid in a pipe line. Where pressure reducing valves are used, it is generally necessary to provide a separate gate valve upstream from the pressure reducing valve and a separate gate valve downstream from the pressuring reducing valve. Further, the pressure reducing valve itself generally has a significantly smaller inlet and outlet diameter than the diameter of the pipe line in which it is installed so that size reducers and other fittings are required to install such valves in the pipe line. When the pressure reducing valves fail, they fail completely, thus allowing flow of fluid through the valve at full pressure which can result in considerable damage to pipes or other items downstream of the valve which are suppose to be protected from such high pressures by the pressure reducing valve.

A common type of pressure reducing valve in use today has a passage that extends from the inlet of the valve, through a valve seat, to the outlet of the valve. A valve disc is positioned against the valve seat to block the flow passage through the valve when it is desired to stop flow of fluid therethrough, and is adjustably positioned a distance from the valve seat to open the passage a selected amount to allow controlled flow through the valve and controlled pressure reduction in the fluid flowing through the valve from inlet to outlet. This type of valve has the disadvantages of relatively large size and weight for a given flow volume and a number of mechanical parts that are subject to wear. Cla-Val Co. of Newport Beach, Calif. manufactures a valve of this type which has four separate valve seats with associated separate valve discs spaced about a valve body.

Rather than using a valve seat and associated valve disc, some valves, such as those manufactured by the Roll Seal Valve Company, Inc. of Temecula, Calif., use an elastomeric liner to control fluid flow. These valves include a valve seat extending circumferentially about the inside of the valve body with the liner extending about an inner portion of the valve body and inflatable so that when filled with a pressurized fluid, will press against the valve seat to close the flow passage through the valve. By controlling the pressure of the fluid in the liner, flow through the valve is controlled. The problem with this type of valve is that the liner can be ruptured or dislodged, thereby causing the valve to fail so pressure is no longer controlled downstream of the valve. Another problem is that if the liner ruptures or becomes dislodged, the valve must be removed in order to replace the liner.

SUMMARY OF THE INVENTION

According to the invention, a flow control and pressure reducing valve includes a valve body, preferably cast as a single piece, having an inlet chamber and an outlet chamber. Partition means, preferably integrally cast with the valve body, separates the inlet and outlet chambers. The valve body preferably is cylindrical in form with a central bore which is divided into the inlet chamber and outlet chamber by the partition means which preferably takes the form of a wall or plate extending perpendicularly to the axis of the central bore.

A plurality of passages are formed in the valve body spaced circumferentially around the partition means and extending through the valve body around the partition means from the inlet chamber to the outlet chamber. Each passage has an inlet portion opening into the inlet chamber adjacent one face of the partition means and an outlet portion opening into the outlet chamber adjacent the other face of the partition means. In addition to extending between the inlet and outlet chambers, the passages preferably also extend radially through the valve body to form an outside passage access opening on the outside surface of the valve body. The passages serve as receptacles for flow control means and preferably taper inwardly toward the inside of the valve body to take the form of truncated cones.

Elastomeric flow control means are positioned in the passages and are responsive to pressurized fluid introduced into the flow control means to controllably restrict the passages. When operated to close a passage, the flow control means extends across the passage inlet and passage outlet portions and seats against the portion of the partition means between the inlet and outlet portions to thereby block the passage to prevent flow of fluid therethrough. In other positions, the flow control means is operated so that it is displaced from the portion of the partition means between the passage inlet and passage outlet portions to allow flow of fluid around the partition means. The distance the control means is displaced from the partition means determines the size of the flow passage and the amount of fluid allowed to flow around the partition means. The flow control means preferably take the form of elastomeric bladders configured to be snugly received in the passages. One side of the bladder extends across the passage inlet and passage outlet portions as described above, while the other end of the bladder extends across the outside access opening of the passage. The bladder is held in place by a cover extending across such outside opening. This cover may advantageously take the form of a ring extending about the valve body. While each passage may receive a separate bladder, it is preferred that each bladder be configured to fit into several adjacent passages. Each bladder, whether configured to fit into individual passages or into several adjacent passages, has a means for supplying pressurized fluid thereto which generally will take the form of a connector for connection to a source of pressurized fluid. Pressurized fluid in the bladder controls operation of the bladder to control flow through the valve. The actual control of the valve may be accomplished with various well known valve control techniques.

In many cases it will be desireable to include gates within the valve to eliminate the need for separate gate valves located upstream and downstream from the pressure reducing valve. These gates can be operated to stop flow of fluid through the valve in case of a malfunction of the flow control means or its control system. When gates are to be used with the valve, gate mounting means is provided in the inlet chamber for mounting an inlet or upstream gate and in the outlet chamber for mounting an outlet or downstream gate. The gate mounting means advanteagously take the form of gate mounting shafts secured to the partition means and extending outwardly therefrom into both the inlet chamber and outlet chamber along the axis of the central bore of the valve body. In one embodiment of the invention, the gate mounting shafts are threaded and receive thereon mating, internally threaded mounting hubs of the gates. Means are then provided for rotating the gates to cause them to move along the gate mounting shafts either toward a closed position when the gate is adjacent the partition means or an open position when the gate is spaced from the partition means to allow flow of fluid between the gate and partition means. The gates may be driven individually through the direct engagement of a worm-rod with a handle at its end, or they may be driven simultaneously by means of a drive assembly including a worm-rod with handle at its end which drives a pinion and tie rod. The pinion drives one of the gates while the tie rod drives a second pinion which drives the other gate. For automatic operation of the gates, the gates may be driven by motors actuated by pressure sensor or various other controls.

An important advantage of the valve of the invention is that the elastomeric flow control means of the valve may be easily removed and replaced without having to remove the valve from the line. This is accomplished with flow through the valve stopped by either the internal gates of the valve, or by other means if the valve is not provided with internal gates, by merely sliding the cover from over the outside access openings of the passages, removing the flow control means to be replaced, and inserting the new flow control means. The cover is then replaced to hold the flow control means in place. Further, since a plurality of separate flow control means are used, if one fails, it only effects a portion of the valve so the valve can still function and does not fail completely. The valve of the invention can incorporate a pressure sensor in communication with the passages to sense if a flow control means fails and produce a warning signal to indicate such failure closed to stop flow of fluid. This eliminates the need for separate installation of such means.

THE DRAWINGS

In the accompanying drawings, which illustrate the best mode presently contemplated for carrying out the invention:

FIG. 1 is a transverse vertical section through the center of a valve of the invention;

FIG. 2, an axial vertical section taken on the line 2—2 of FIG. 1;

FIG. 3, an axial vertical section similar to that of FIG. 2, but showing the gates and their mounting shafts removed to show the interior of the valve body;

FIG. 4, a transverse vertical section similar to that of FIG. 1, but showing the gate and gate control means in phantom behind the partition plate of the valve and showing the flow control means removed;

FIG. 5, an axial vertical section similar to that of FIG. 2, but showing a different embodiment of the valve;

FIG. 6, a transverse vertical section similar to that of FIG. 1, but showing the valve of FIG. 5;

FIG. 7, a fragmentary transverse section through a portion of a bladder and receptacle taken on the line 7—7 of FIG. 3 to show the shape of the bladder and receptacle;

FIG. 8, a fragmentary transverse section similar to that of FIG. 7, but showing a different embodiment;

FIG. 9, a fragmentary transverse section similar to that of FIG. 7, but showing a different embodiment;

FIG. 10, a fragmentary transverse section similar to that of FIG. 7, but showing a different embodiment;

FIG. 11, a fragmentary vertical transverse section taken on the line 11—11 of FIG. 2;

FIG. 12, a fragmentary top plan view of a portion of the threaded gate mounting shaft of FIG. 2;

FIG. 13, an axial vertical section similar to that of FIG. 2, but showing another embodiment of the invention;

FIG. 14, an axial vertical section, again similar to that of FIG. 2, but showing yet another embodiment of the invention;

FIG. 15, a fragmentary transverse vertical section taken on the line 15—15 of FIG. 14; and FIG. 16, an axial vertical section similar to that of FIG. 13, but showing the gate valve in the outlet chamber rather than the inlet chamber.

DETAILED DESCRIPTION OF THE ILLUSTRATED EMBODIMENT

Figure 1:
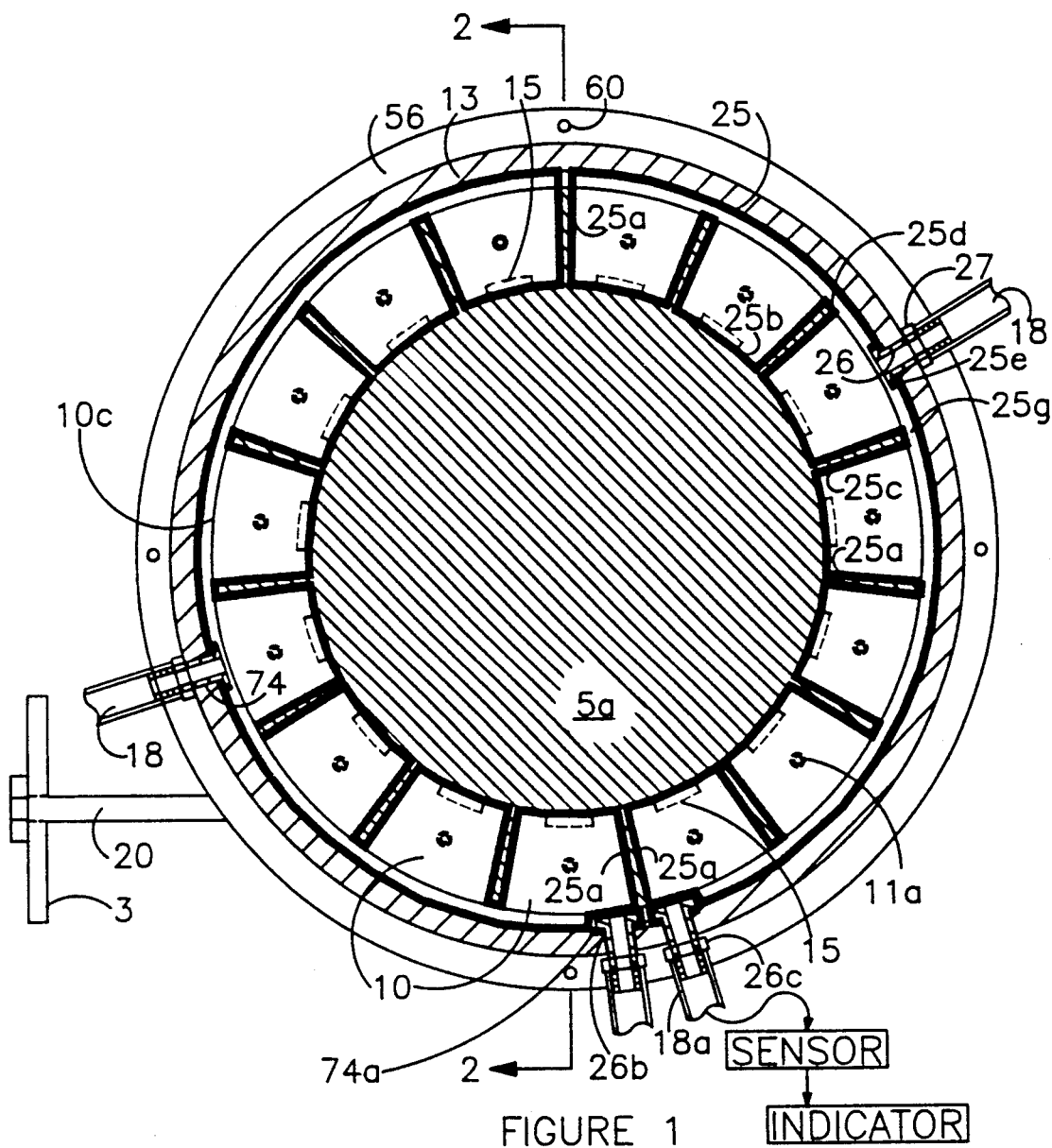

As shown in FIGS. 1-4, a pressure reducing valve of the invention includes a cylindrical valve body 5 having a central bore therein divided into an inlet chamber 6 and an outlet chamber 7 by a partition plate 5a which extends across the central bore perpendicularly to the bore's longitudinal axis. The partition plate is preferably formed integrally with the valve body such as by casting.

A plurality of flow control means receptacles 10 are formed in valve body 5 and are spaced circumferentially around the partition plate 5a. Each of the receptacles 10 forms a passage extending between inlet chamber 6 and outlet chamber 7 around partition plate 5a. Each passage has an inlet portion 10a, FIG. 3, and an outlet portion 10b. The partition plate 5a separates the inlet portion 10a from the outlet portion 10b of each passage. Preferably, the receptacles and partition plate are located so that the inlet and outlet portion of each passage are symetrically located adjacent opposite faces of the partition plate 5a and are of equal size, as shown. The receptacles 10 extend radially through the valve body 5 to an outside passage access opening 10c, FIGS. 3 and 4, on the outside surface of valve body 5. The receptacles are shown as tapering inwardly toward the inside of the valve so that each of the receptacles 10 take the form of a truncated cone, see particularly FIG. 3.

Figure 2:
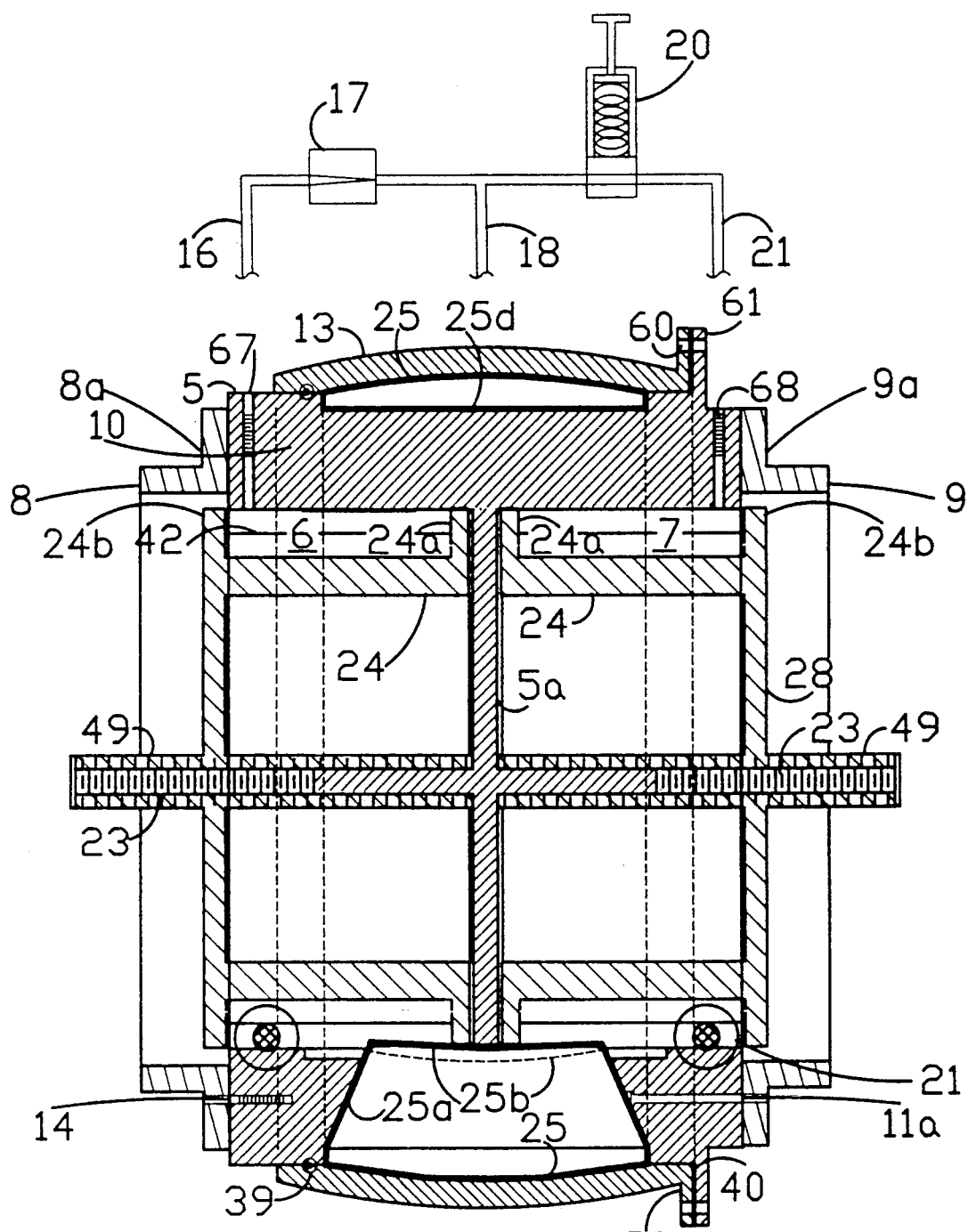
Figure 3:
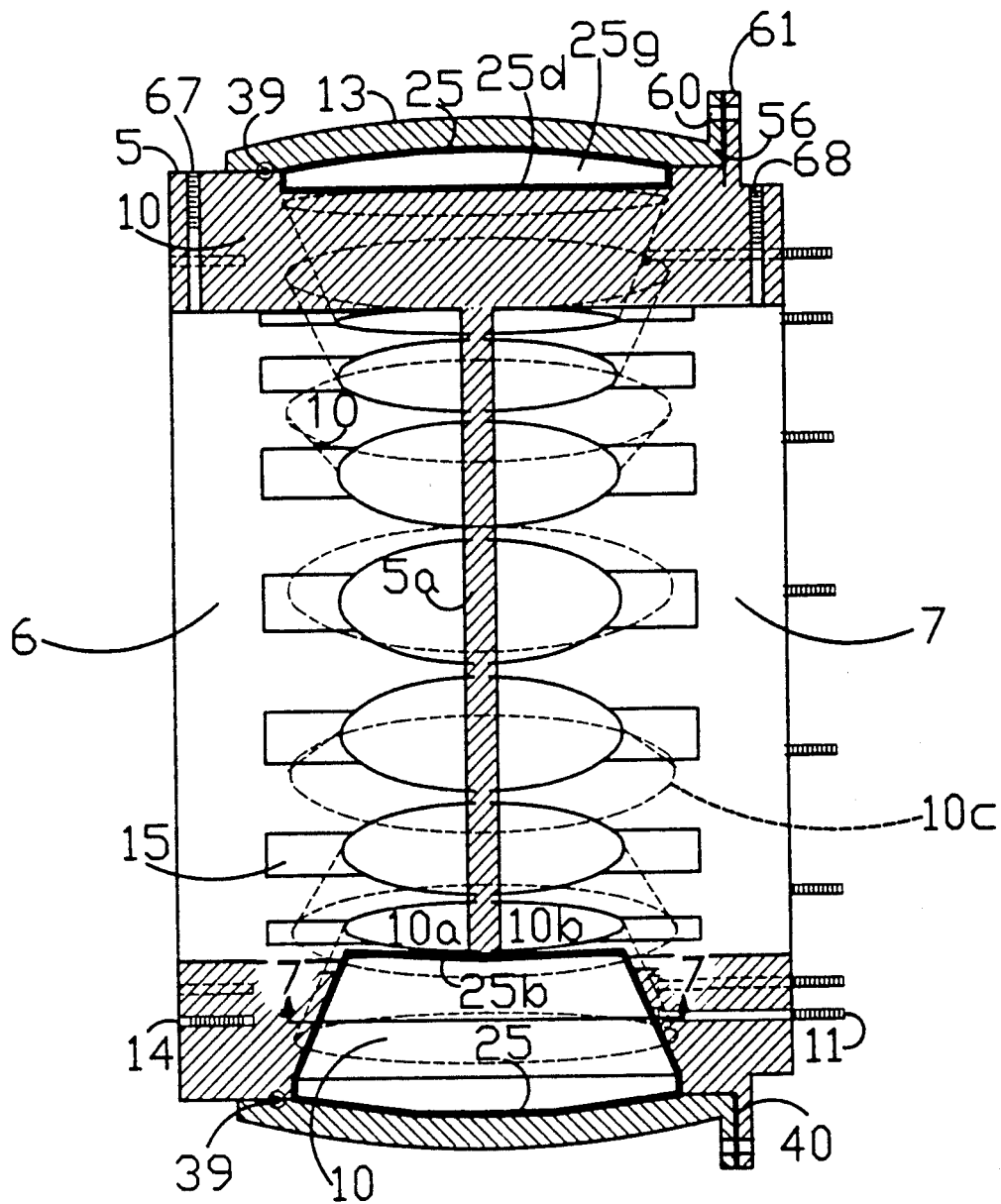
Figure 4:
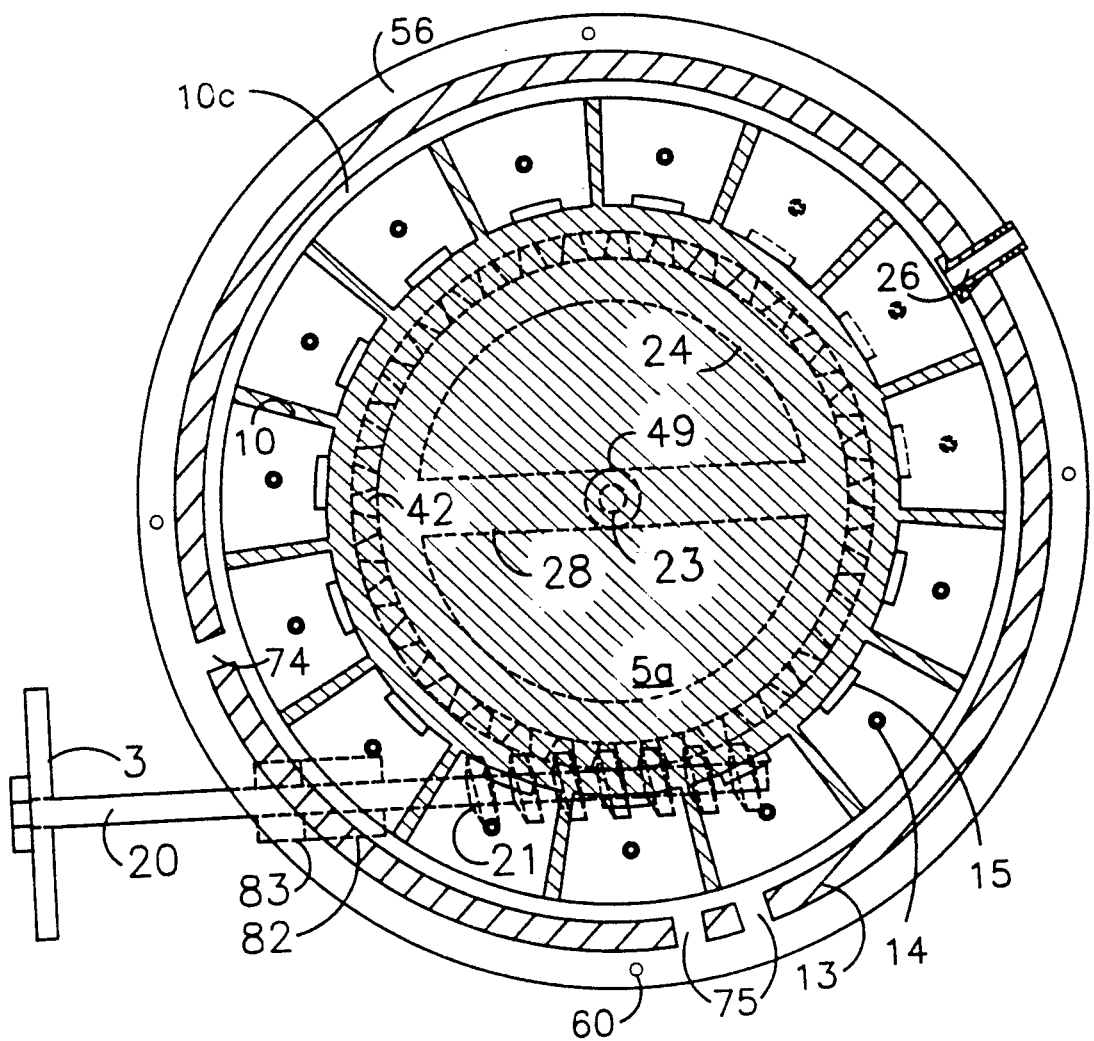
Figure 7:
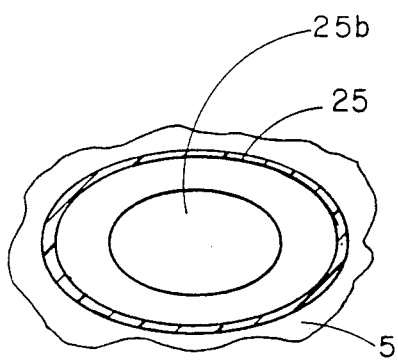

Elastomeric flow control means are shaped to fit into and be snugly received within the receptacles 10. These flow control means may conveniently take the form of elastomeric bladders 25. The portions of the bladder which fit into the passages 10 are shaped similarly to such passages as shown in FIGS. 1-3. FIG. 7, a transverse section through a bladder and receptacle, further illustrates the shape of the receptacles and received bladders therein. While a separate bladder control means could be provided for each receptacle, it is preferred that the bladder be formed to fit into several adjacent receptacles as shown in FIGS. 1 and 4 where one bladder 25 is shown as formed to fit into seven adjacent receptacles and a second bladder 25 is shown as formed to fit into the remaining eight adjacent receptacles. In such case each bladder is elongate with a plurality of bladder extensions on one side thereof with each extension configured to fit into a receptacle. While a single common bladder could be formed to fit into all receptacles of the valve, it is preferred that the receptacles be divided into at least two sets with two independent bladders as shown. Sides 25b of the bladders are configured so that they can assume a position as shown in FIGS. 2 and 3 wherein they extend across passage inlet portion 10a and passage outlet portion 10b and seat against the portion of partition plate 5a therebetween to prevent communication between inlet 10a and outlet 10b. The bladder wall 25b, however, can be deformed to move away from partition 5a to allow communication between the inlet and outlet as shown by broken lines in FIG. 2.

The bladders 25 are held in the receptacles 10 by cover ring 13, which is secured in position over the receptacles by means of flange 56 along one side thereof which mates with flange 61 extending from valve body 5. Bolts, or other fasteners, extending through mating holes 60 in the two flanges may be used to secure the cover ring 13 to the valve body. With such construction, cover ring 13 can be easily released and slid away from flange 61 to either partially or completely expose the passage access openings 10c of the control means receptacles 10 to allow easy access to the receptacles for replacement. A gasket 40 between the abutting flanges and an "O"-ring 39 positioned in valve body 5 to bear against the inside edge surface of the cover ring opposite the edge with the flange, seal the cover ring against leakage when secured in place over the receptacles. If desired, the outside of the valve body could be tapered to facilitate movement of cover ring 13.

Each of the bladders 25 is provided with a connector 26, FIG. 1, communicating with the inside of the bladder and adapted to be connected to a source of pressurized fluid. Connectors 26 extend through openings 74 provided in cover ring 13. Connectors 26 are shorter than the depth of the receptacles 10 so that a bladder 25 may be easily installed by positioning it in the appropriate receptacle and depressing the connector into a receptacle thereby deforming the bladder to which it is attached and manuevering the connector under a portion of cover ring 13 to the appropriate receiving opening 74. The resilient nature of the bladder will generally push the connector through hole 74. The connector can then be sealingly secured to ring 13 by a nut 27 threaded onto the outside of the connector, or by a threaded hose connector which connects the bladder to a source of pressurized fluid. In either case, the base of the connector where attached to the bladder is covered with the elastomeric material of bladder 25 so hole 74 is sealed as the base of the connector is pulled against ring 13. Conduits 18 are attached to connectors 26 and extend to a source of pressurized fluid for pressurizing bladders 25.

The structure described so far provides a basic flow control and pressure regulating valve of the invention which is shown in this basic form in FIG. 3. The valve may be attached, as shown in FIG. 2, to the flange 8a of an inlet pipe or size reducer 8 by means of bolts threaded into mounting holes 14 and to flange 9a of outlet pipe or size reducer 9 by means of bolts 11, FIG. 3, passing from the flow control means receptacles 10 through openings 11a, FIG. 2, in valve body 5 and flange 9a. Either of the securement methods described can be used on either side of the valve, or other means could be used to secure the valve to mating pipes.

Passage 67, FIGS. 2 and 3, extends through valve body 5 to communicate with valve inlet chamber 6 and provide fluid at the inlet pressure through conduit 16, FIG. 2, to a needle valve 17. After passage through the needle valve, the fluid is provided to the interior of the bladder through conduit 18 and also to a control or pilot valve 20. From the pilot or control valve the fluid is connected through conduit 21 to passage 68 which extends through valve body 5 to communicate with outlet chamber 7. This is a standard pressure control system for pressure regulating valves and supplies pressurized fluid to the bladder to operate the valve. By adjustment of the control valve 20, any pressure between the inlet and outlet pressures of the valve of the invention can be maintained within the bladder 25. The system works in well known manner to adjust the pressure in bladder 25 so that the valve of the invention will maintain a constant output pressure regardless of the inlet pressure. Presently, it is anticipated that a separate control system connected to passages 67 and 68 should be used for each separate bladder used in the valve. Various other valve control systems can be used to supply pressurized fluid to the bladders 25, and, if independent control is desired, the bladders can be connected to a source of controlled pressurized fluid independent from the fluid being controlled by the valve.

In operation of the valve, when the pressure inside bladder 25 is substantially the same as the pressure of the fluid entering the valve and acting against walls 25b of bladder 25, the pressure inside bladder 25 is sufficient to hold bladder walls 25b against the partition plate 5a, as shown in solid lines in FIG. 2, thereby holding the valve in closed condition with walls 25b blocking flow of fluid between passage inlet portions 10a and passage outlet portions 10b. When the pressure of the fluid inside bladder 25 is reduced, bladder walls 25b are displaced from their seats against partition plate 5a, such as shown by broken lines in FIG. 2, thereby connecting passage inlet portions 10a and passage outlet portions 10b to allow flow of fluid through the valve around partition plate 5a. By adjusting the pressure supplied to a bladder 25, the displacement of bladder walls 25b and thus the amount of flow allowed around partition plate 5a can be accurately controlled.

Because a plurality of receptacles are provided in the valve and because separate bladders are used in connection with separate groups of these receptacles, if one of the bladders should rupture, the remaining one or more bladders will continue to operate to control pressure and flow through the valve. Thus, if two bladders are used, and one of the bladders ruptures, full flow may occur through the passages with the ruptured bladder and complete stoppage of flow and reduction to zero pressure of the output cannot occur. However, the remaining unruptured bladder will continue to operate and the valve will be effective to control the flow and pressure drop through the valve through an upper portion of the normal control range of the valve. The more independent bladders that are used, the less effect the rupture of one of the bladders will have on the operation of the valve, i.e., the larger will be the portion of the normal control range that remains effective. Thus, the number of independent bladders used can be chosen based upon the least allowable pressure drop between inlet and outlet of the valve, i.e., the maximum pressure allowed at the outlet of the valve. This is a significant advantage of the valve of the invention.

In order to provide an indication of a bladder rupture, a conduit 26b may be provided through an opening 75 in cover ring 13 located at an end of a bladder as shown in FIG. 1. A separate conduit 26b will be provided for each separate bladder used. Each conduit 26b is secured to cover ring 13 by nut 26c. Openings 75 are sealed by gaskets 74a. In normal operation of the valve, the bladder 25 covers and seals the opening to conduit 26b as shown in FIG. 1. If a bladder ruptures, the turbulence of the water flowing through the receptacles with the ruptured bladder is sufficient to dislodge the end of the bladder to the extent that fluid at substantially the inlet pressure enters conduit 26b. Conduit 26b is connected to a pressure sensor, which, upon sensing pressure in the conduit will generate a signal which is sent to an indicator means to activate the indicator means to provide an alarm or other indication of a ruptured bladder.

Another significant advantage of the valve of the current invention is that a bladder can be replaced without removing the valve from the line. The flow of fluid through the valve must be stopped, such as by a separate gate valve upstream of the valve of the invention. Then cover ring 13 is slid away from flange 56 to at least partially uncover the receptacles 10. The resilient bladders can then easily be removed and replaced as desired. With the embodiment of FIGS. 1-4, conduit 16 to needle valve 17 will have to be disconnected to allow cover ring 13 to be slid from its position over the receptacles. Since only a partial uncovering of the receptacles is necessary, it will generally not be necessary to remove the conduits 26b or the conduits 26 from cover ring 13 for the bladders not being replaced.

Figure 8:
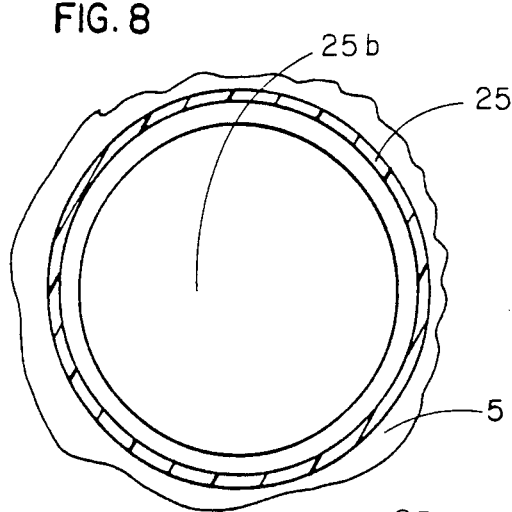
Figure 9:
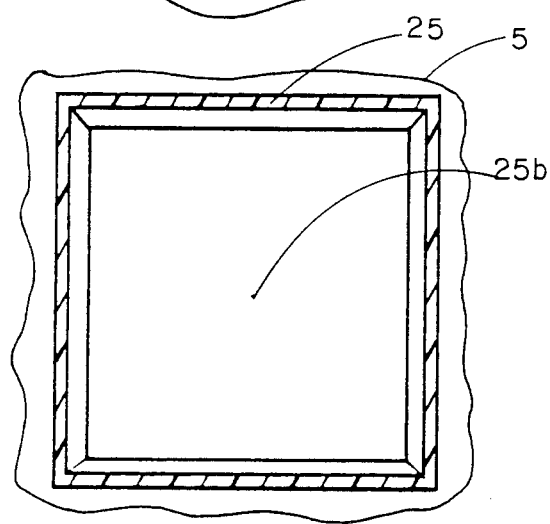
Figure 10:
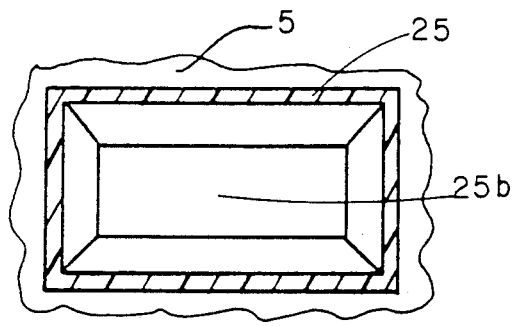

It should be realized that the number of receptacles 10 provided in the valve, the size of such receptacles, and the wall thickness between receptacles will vary with the size of the valve and the desired flow capacity of the valve. Also, the particular configuration of the passages can vary with the preferred configuration being the truncated cones illustrated, wherein, if the cones were extended, the apex of each cone would lie on the central longitudinal axis of the valve body. Alternatively, the cones could be such that the apex of each cone extends beyond the center of the valve body so that the apexes lie on a circle with the center of the valve body the center of the circle. Several alternative preferred configurations for the passages and bladders are shown in FIGS. 8 to 10. FIG. 8 shows an alternate cone configuration while FIGS. 9 and 10 show alternate pyramid configurations. It is preferred that the side walls of the receptacles 10 slope inwardly, giving the truncated cone configuration illustrated or an alternate pyramid configuration, so that the pressurized fluid in the bladders against bladder walls 25a will work against the side walls of the receptacles and the bladders will remain seated against the side walls to prevent leakage of the fluid in the valve around and behind the bladders. In addition, the particular configuration of the portions of the partition plate 5a extending over the passages or receptacles 10 between the passage inlet and outlet portions may vary as may the configuration of bladder walls 25b which mate against such partition plate portions. It is preferred that the partition plate portions be semicircular as shown and that the bladder walls 25b be normally similarly semicircular or partially spherical, as shown, to provide good sealing characteristics. However, the portions of the partition plate over the passages could be semicircular away from the passages, oppositely to the configuration shown, so the partially spherically walls 25b would normally extend outwardly from bladder 25 to close the passages. This configuration could increase the flow capacity of the valve. Various other configurations could also be used.

Where the valve of the invention is to be used to reduce extremely high pressures, it may be desireable to include gates in the valve to help control the flow and pressure drop through the valve. With gates included in the valve, the valve becomes a two or three step reducing valve depending upon whether one or two gates are used. To provide gates in the valve of FIGS. 1-4, two shafts 23, FIG. 2, are secured to partition plate 5a with one shaft extending along the central longitudinal axis of the bore of the valve into the inlet chamber and the other shaft extending along the central longitudinal axis of the bore into the outlet chamber. With the particular embodiment shown in FIG. 2, the shafts 23 are threaded to receive thereon the threaded mounting hubs 49 of cylindrical gates 24. Arm rods 28, FIGS. 2 and 4, extend across the axis of the gate and secure the gate mounting hubs 49 to the cylindrical gate bodies 24. End flanges 24a and 24b are provided at opposite ends of the cylindrical gate bodies 24 and are sized to closely fit into either the valve inlet chamber 6 or valve outlet chamber 7, as appropriate. The arms, shaft, cylindrical gate body and flanges may be of single piece construction or may be built up from separate components. The outside circumference of each gate body 24 between the flanges is configured to provide longitudinally extending teeth 42 which engage worm gears 21 of drive rods 20 which extend through packing glands 82 and retaining nut 83 in valve body 5. Wheel handles 3 on the ends of drive rods 20 allow the drive rods to be easily turned to cause rotation of the gates on shafts 23. Rotation of the gates cause them to move longitudinally along shaft 23 toward or away from partition plate 5a, the direction of movement depending upon the direction of rotation of the shafts. With the embodiment of FIGS. 1-4, separate drive shafts are provided for each of the gates so each gate can be moved independently. Thus, gate 24 in inlet chamber 6 can be positioned to provide a controlled flow passage between the flange 24a and the partition plate while the gate 24 in outlet chamber 7 can be positioned to provide a controlled flow passage between its flange 24a and the partition plate. These passages may be set to provide a maximum flow and minimum pressure restriction while the bladder flow control means 25 provide flow and pressure regulation for the valve.

Figure 12:
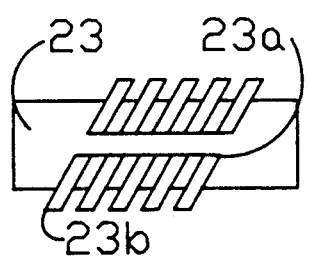
Figure 11:
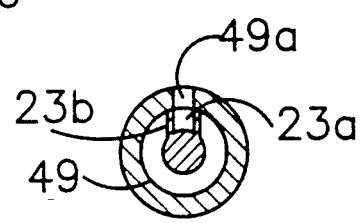

It is preferred that the threads 23b on shafts 23 be discontinuous, such as by having a channel 23a cut longitudinally through the threads, FIGS. 11 and 12, and that the gate mounting hubs 49 have holes 49a therethrough periodically along their length. This allows any deposits which build up on the threads of the shafts to be removed from the shafts and exuded through the holes 49a.

No seals are used with the gates shown in FIG. 2 so that with the gates in closed position shown in FIG. 2, there is still a small clearance between the gate body 24 and the partition plate 5a so some flow of fluid therebetween can occur. Thus, in order to replace a bladder 25, it is still necesary to shut off flow to the valve with a separate gate valve upstream of the illustrated valve.

As described above, with the valve of FIGS. 1-4, in order to replace a bladder, it is necessary to shut off the flow of fluid through the valve by use of an additional gate valve upstream of the valve of the invention. In some instances this is not a problem, but in many instances, it would be advantageous to eliminate the need for the separate gate valves which are generally required. As described above, the construction of the valve of the invention advantageously allows gates to be easily provided within the valve itself. These gates may be configured to include seals to thereby actually block flow through the valve when closed so that additional gate valves upstream or downstream of the valve of the invention are not needed.

Figure 5:
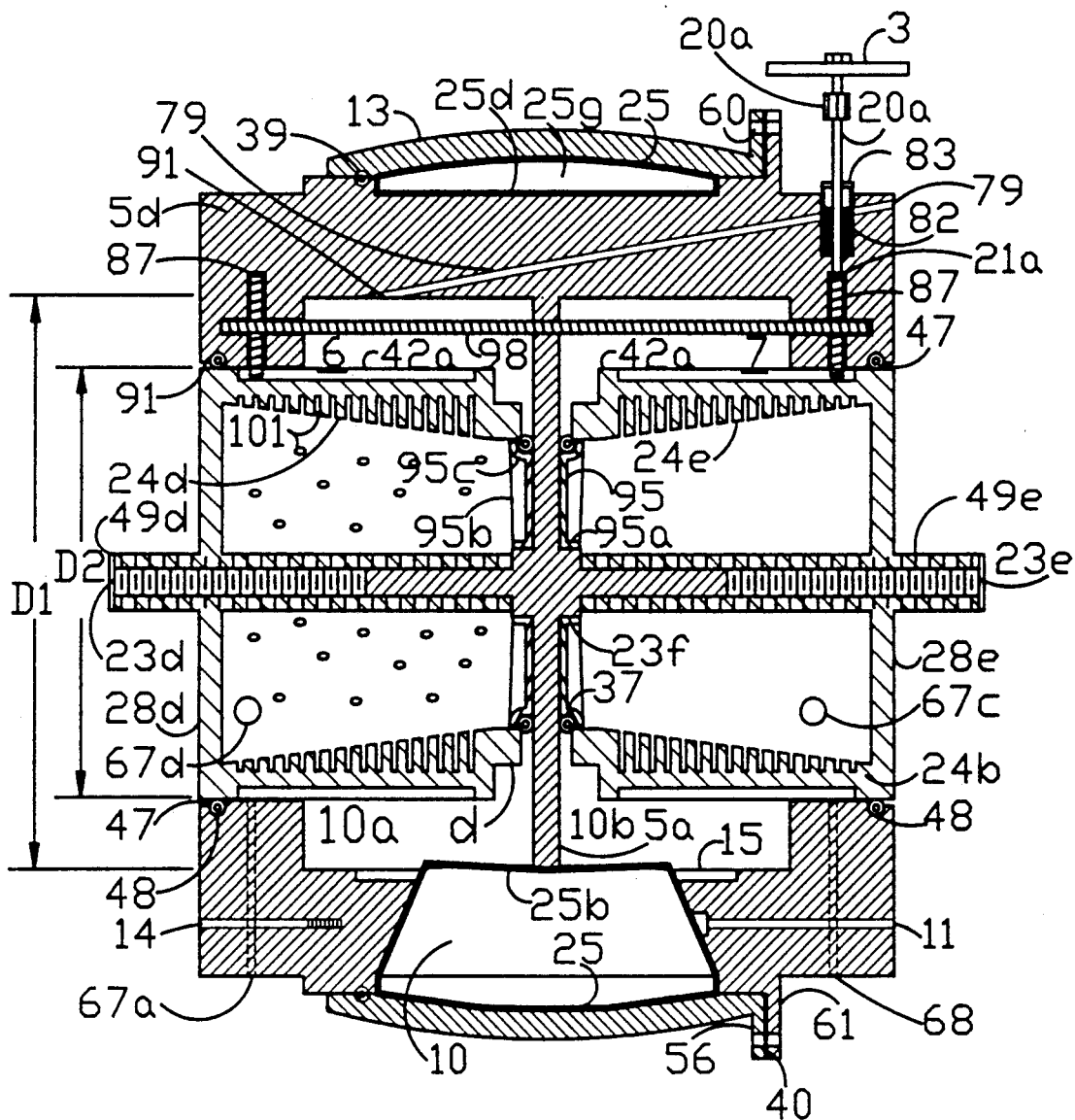
Figure 6:
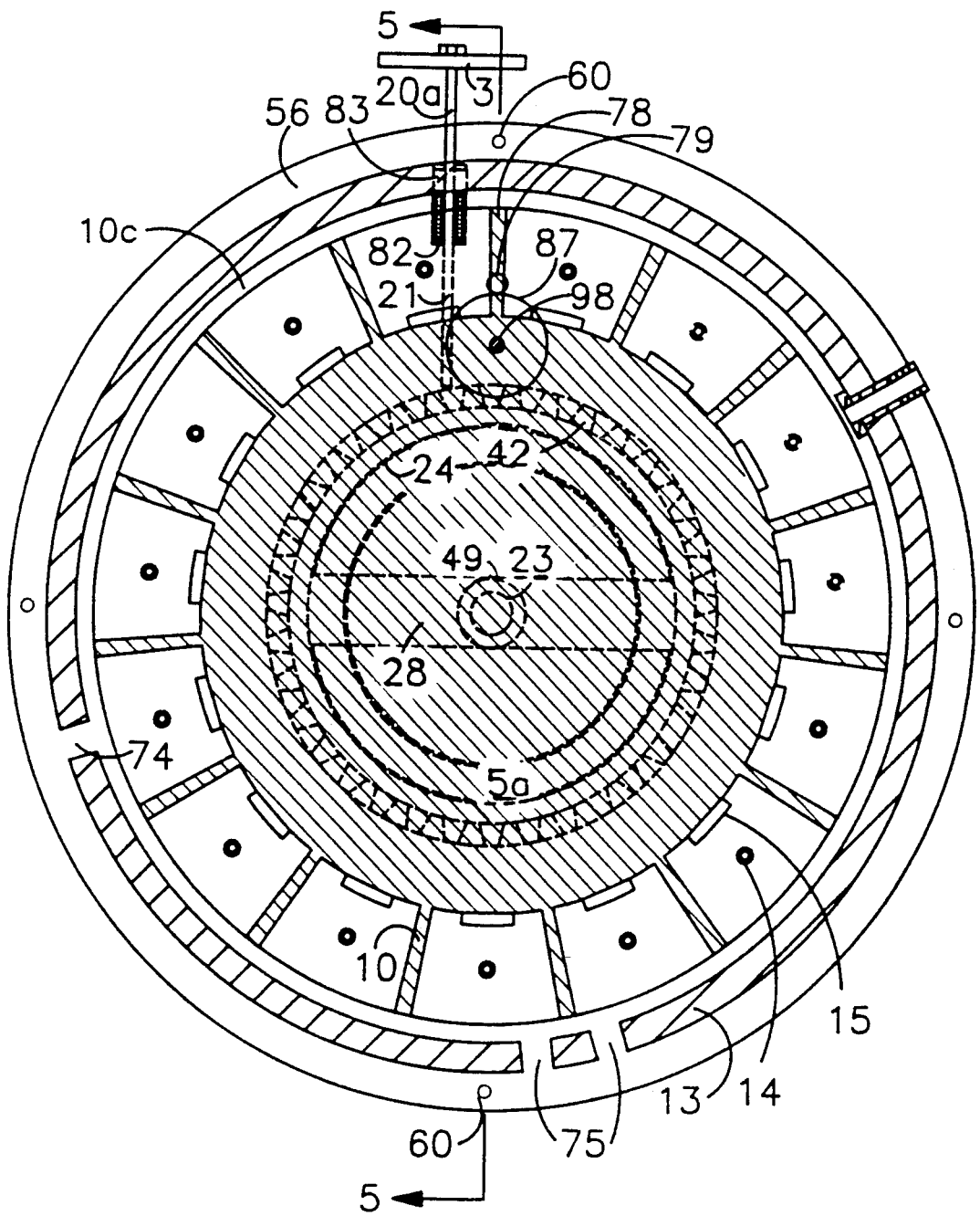

FIGS. 5 and 6 show an embodiment of a valve of the invention wherein the gates are provided with seals so completely stop flow through the valve when closed. Further, the valve has been modified so that the gates are moved simultaneously with a single gate control and the passage communicating with the inlet chamber of the valve has been modified so the conduit to the needle valve does not have to be removed in order to slide the cover ring from over the passage access openings.

As shown in FIGS. 5 and 6, a valve body 5d has a partition plate 5a and a plurality of passages 10 as in the embodiment of FIGS. 1-4. However, the embodiment of FIGS. 5 and 6 has an enlarged wall area 78, FIG. 6, between two of the passages 10 to provide space for a conduit 79 which extends from opening 91 connecting with valve inlet chamber 6 to an outlet 79b on the opposite side of the valve. This conduit 79 takes the place of conduit 67 of the embodiment of FIGS. 1-4 and moves the connection of conduit 16 to the opposite side of the valve so it does not interfer with the movement of cover ring 13.

Partition plate 5a has a threaded shaft 23d, FIG. 5, extending into inlet chamber 6 and threaded shaft 23e extending into outlet chamber 7. Each of these shafts has an enlarged threaded portion 23f adjacent the partition plate 5a to receive thereon a seal holding plate 95 with central, threaded mounting hub 95a. About the circumference of each plate 95 is a cupped rim 95c which holds a gasket 37. Plates 95 are provided with radial ridges 95b to make an acoustical, knurled surface.

Gate 24d is mounted for rotation on shaft 23d and identical gate 24e is mounted for rotation on shaft 23e. Gates 24d and 24e are tapered so that the central flow passage through the gates is reduced in size toward the partition plate. Each gate has longitudinal teeth 42a about its outer circumference to mate with pinions 87. Pinions 87 are secured to shaft 98 so that they rotate together. A worm 21a, FIG. 6, on drive rod 20a passing through packing glands 82 and retainer nut 83 engages one of the pinions 87. Rotation of drive rod 20a, by means of wheel handle 3, causes the pinion 87 with which it is engaged and shaft 98 to rotate, thus also rotating the other pinion 87 mounted on shaft 98. Both gates 24d and 24e are thus rotated simultaneously.

When gates 24d and 24e are adjacent to partition plate 5a, as shown in FIG. 5, the inside edge of the gate contacts sealing gasket 37 to completely block all flow of fluid between the gates and the partition plate. A sealing gasket 47 in body groove 48 provides a seal about the outside of respective gates 24d and 24e to block any flow of fluid about the outside of the gates.

The inside surfaces of gates 24d and 24e are provided with a plurality of holes 101. These holes are provided to reduce the weight of the gates and also, importantly, to reduce the noise generated by flow of fluid through the gates.

It will be realized that the diameter of the pipes or reducers to which the valve is attached does not have to be the same as the diameter of the inlet chamber of the valve. Thus, as shown in FIG. 5, the inlet to the valve has a diameter D2 while the pipe to which it is connected may have a larger diameter of D1.

Figure 13:
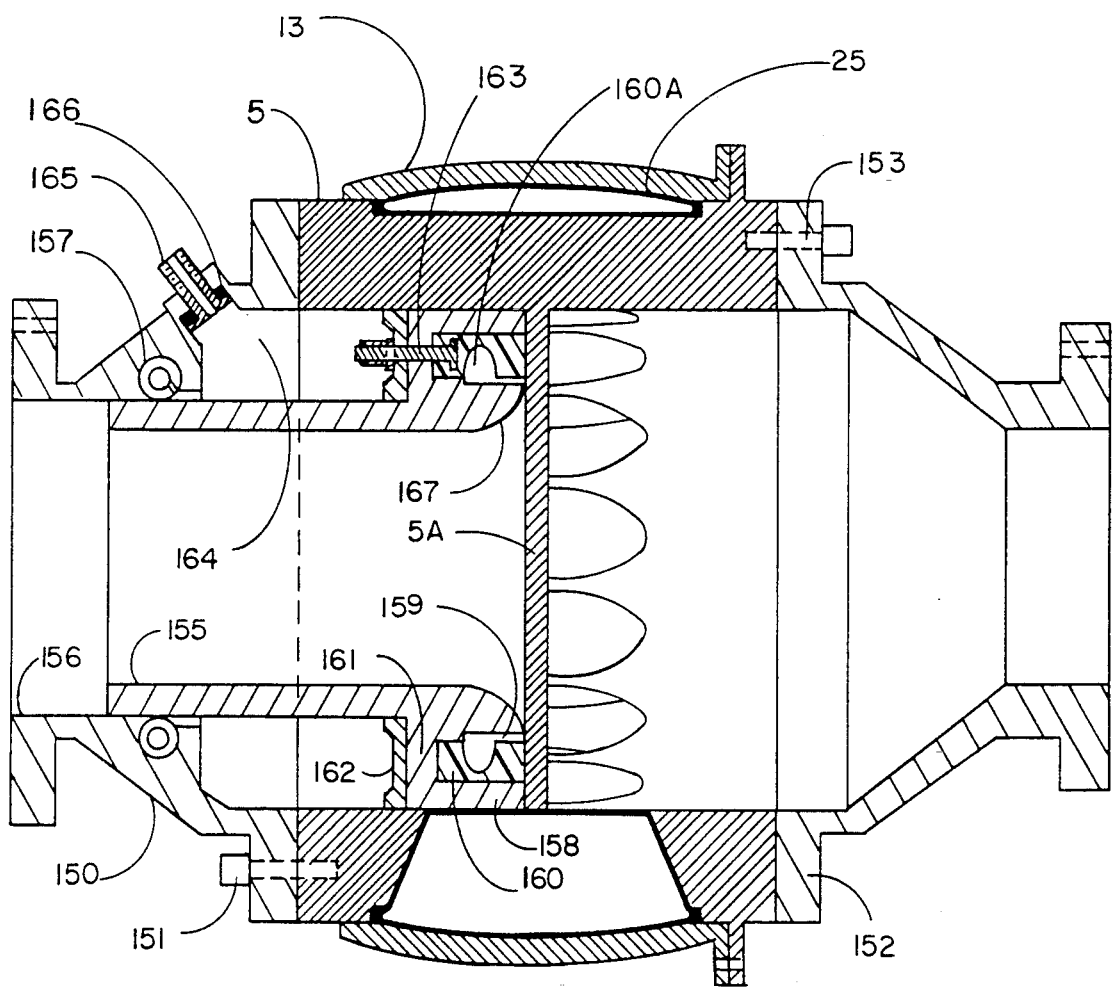

FIG. 13 shows another embodiment of a valve of the invention having a hydraulically activated gate in the inlet chamber of the valve. The valve of FIG. 13 includes the cylindrical valve body 5 with partition plate 5a, as well as the plurality of passages extending from the inlet chamber to the outlet chamber around the partition plate and the elastomeric flow control means as explained for the previous embodiments. A size reducer 150 is secured to the inlet end of the valve body by bolts 151, while a size reducer 152 is secured to the outlet end of the valve body by bolts 153.

A cylindrical gate 155 is sized to be snugly but slidingly received in the inner, reduced diameter portion 156 of reducer 150, as shown, with a gasket 157 mounted in reducer 150 to form a fluid tight seal between the reduced diameter portion 156 of the reducer and gate 155. Gate 155 has an enlarged flange 158 at its end toward partition plate 5a sized to be snugly but slidingly received within the inlet chamber of valve body 5. The end of flange 158 toward partition plate 5a has a groove 159 therein within which is received a gasket 160. The opposite end of the flange forms a shoulder 161 which has a gasket 162 mounted thereon. A bolt fastener 163 may be provided to secure gaskets 160 and 162 in place. Gasket 162 forms a fluid tight seal between gate 155 and valve body 5, to form a fluid tight space 164 between the outer surface of gate 155 and the inside surfaces of valve body 5 and reducer 150.

A connector 165 communicates with space 164 and extends through reducer 150. The connector is adapted to be connected to a source of pressurized fluid. Gasket 166 ensures a fluid tight seal.

In operation, the gate 155 of FIG. 13 can slide toward partition plate 5a to closed position as shown in FIG. 13, or can slide away from partition plate 5a to allow flow of fluid between flange 158 and partition plate 5a. Gasket 160 is provided with an annular groove 160a therein which communicates through groove 159 with the pressurized fluid in the inlet chamber so that the fluid pressure will help press gasket 160 against partition plate 5a when the gate is in closed position to thereby ensure a fluid tight seal.

The forward edge of flange 158 is tapered in a smooth curve from the inside thereof as at 167. This provides an area upon which pressurized fluid in the inlet chamber acts in a direction to try to move the gate to an open position.

Movement of gate 155 is controlled by pressurized fluid supplied to space 164. When pressurized fluid is supplied through connector 165 to space 164, it will counteract pressure acting on tapered face 167 and, if the pressure is greater than that acting on face 167, causes the gate to move to its closed position shown. If the pressure in space 164 is less than that acting on face 167, the gate will move toward open position away from the partition plate 5a until the pressures are equalized.

Thus, by controlling the pressure of fluid supplied to space 164, movement of the gate is controlled. With such arrangement, gate 155 can act to control and relieve pressure surges that may occur in closing the gate.

While gate 155 is shown only in the inlet chamber, it could be provided in the outlet chamber rather than in the inlet chamber, or similar gates could be provided in both inlet and outlet chambers. Where gates are provided in both inlet and outlet chambers, one gate may be as shown in FIG. 13, while the other could be of differing configuration and operation, such as a gate as shown in the earlier Figures.

Figure 16:
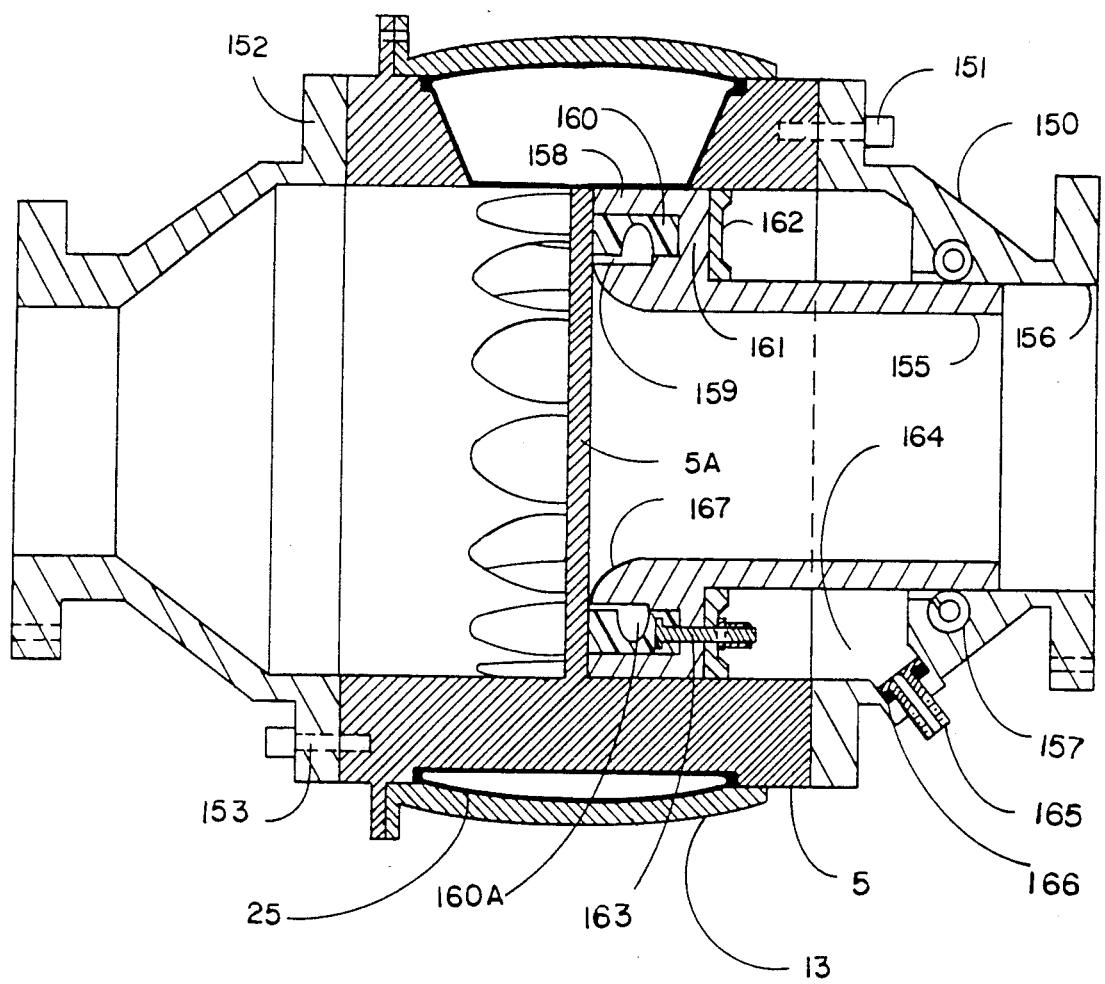

FIG. 16 shows the valve of FIG. 13 inverted so that the gate is in the outlet chamber rather than in the inlet chamber. The operation of the gate is the same as described above. The only difference is that flow of fluid is blocked in the outlet chamber rather than the inlet chamber.

Figure 14:
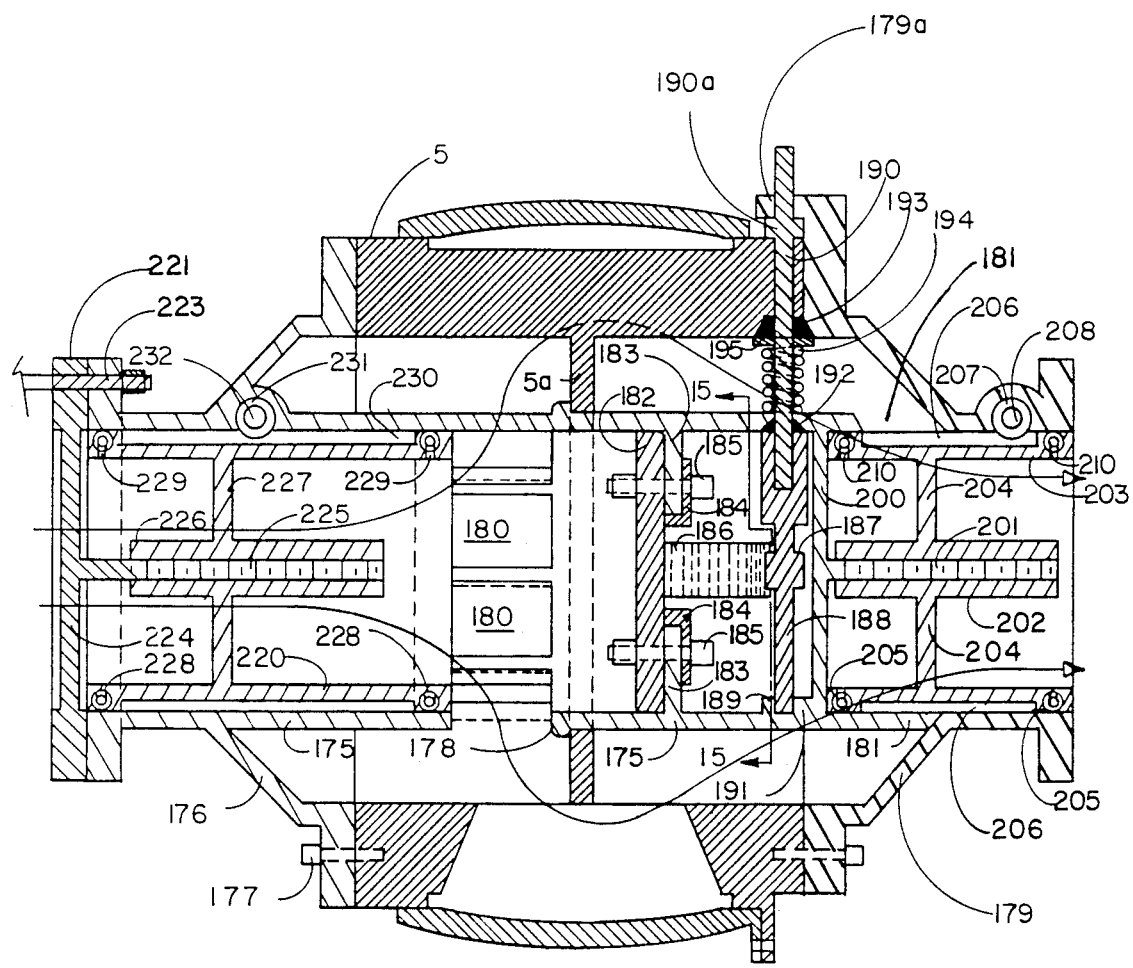

FIG. 14 shows a further embodiment of a valve of the invention which includes a butterfly valve and by-pass passage through the partition plate of the valve. Again, the valve of FIG. 14 includes a cylindrical valve body 5 with partition plate 5a, as well as the plurality of passages around the partition plate and electromeric flow control means. However, partition plate 5a has an opening therethrough in which is positioned a cylindrical insert 175 which provides a by-pass channel or auxiliary passage through the partition plate of the valve. Insert 175 is provided as part of a reducer 176 which is secured to the input side of the valve such as by bolts 177. An integral, annular ring 178 is formed on the outer surface of insert 175 and is positioned to abut partition plate 5a, as shown. This helps to block flow through the partition plate around the outside of insert 175. The end of insert 175 opposite reducer 176 is adapted to abut a reducer 179 secured to the outlet of valve body 5.

Insert 175 is perforated as shown by inlet holes 180 as it passes through the inlet chamber of valve body 5. This forms a screen or grate for fluid entering the inlet of the valve from insert 175. Similarly, the end of insert 175 which passes through the outlet chamber of valve body 5, is also perforated as shown by outlet holes 181 so that water can flow into insert 175. A butterfly valve 182 is rotatably positioned in insert 175 between inlet holes 180 and outlet holes 181. Gate 182 is mounted for rotation on opposed stub shafts 183 projecting toward the center of inser 175 by brackets 184 secured to gate 182 by bolts 185. A semicircular rack 186 is mounted on gate 182 so as to be engaged by pinion gear 187 mounted on shaft 188. The lower end of shaft 188 as shown in FIG. 14 is positioned between insert ears 189 and, when its upper end is positioned to receive the lower end of shaft 190 therein, abuts insert stop 191. This holds pinion gear 187 in engagement with rack 186. Insert ears 189 and stop 191 form a receiving slot for the bottom of shaft 188. The slot is open at one end so that the shaft may be easily slid thereinto. With shaft 190 in place to hold the top of shaft 188, rack 186 acts as a folcrum or support to keep the bottom of shaft 188 in the receiving slot. Shaft 190 and the receiving recess therefor in shaft 188 are keyed so that rotation of shaft 190 causes rotation of shaft 188. With this arrangement, shaft 188 can be easily positioned and held in insert 175. Shaft 190 extends through seal 192 and insert 175, and through seal 193 and valve body 5, to outside the valve body. A spring 194 acting against a washer 195 holds seal 193 securely in place to prevent leakage along the shaft. A projection 179a of reducer 179 extends over valve body 5 where shaft 190 extends from the body to catch an enlarged portion 190a of shaft 190 and hold it securely in position in valve body 5. In this way, shaft 188 is positioned in insert 175, and shaft 190 is inserted through the valve body 5, gasket 193, washer 195, spring 194, insert 175, and gasket 192 into the receiving recess of shaft 188. Reducer 179 is then secured in position so that projection 179a secures the shaft in place.

Figure 15:
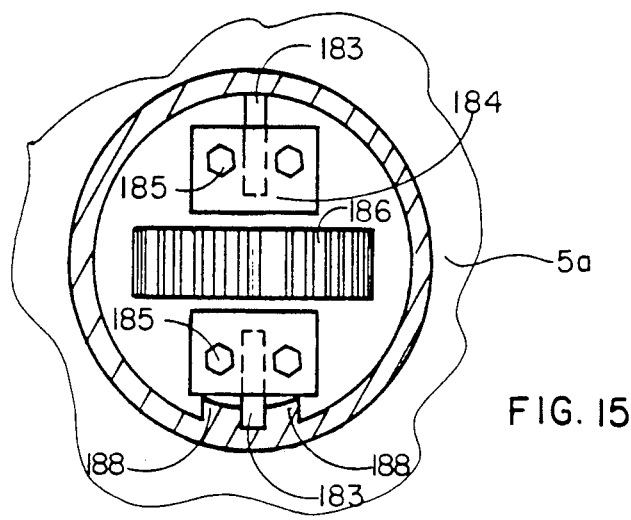

With this arrangement, rotation of shaft 190 from outside valve body 5 causes rotation of the butterfly valve within insert 175. Thus, butterfly valve 182 can be opened or closed from outside the valve. During normal operation of the valve, butterfly valve 182 will be in closed position as shown in FIGS. 14 and 15 to prevent flow of fluid through insert 175 and force the fluid to flow through inlet holes 180 into the inlet chamber of valve body 5, and then to flow in a controlled manner as described above from the inlet chamber to the outlet chamber around partition plate 5a, such flow being controlled by the flow control bladders, and then from the outlet chamber through outlet holes back into insert 175 on the other side of butterfly valve 182.

Insert 175 includes support rod 200 extending from one side of insert 175 to the other across the center thereof near the end opposite reducer 176. A threaded shaft 201 extends from support rod 200 along the central axis of insert 175 for mounting threaded outlet gate hub 202. Cylindrical outlet gate 203 is mounted on outlet gate hub 202 by means of support arms 204. Gate 203 is flanged at both ends with gaskets 205 mounted in the flanges. The outside circumference of gate 203 between the flanges is configured to provide longitudinally extending teeth 206 which engage a worm gear 207 secured to a drive rod 208 which is rotatable from outside the valve body. When drive rod 208 is rotated, worm gear 207 rotates and causes gate 203 to rotate. As gate 203 rotates, hub 202 also rotates therewith and causes longitudinal movement of the gate along threaded rod 201. Thus, gate 203 can be moved between a closed position as shown in FIG. 10 wherein the gate blocks outlet holes 181 to thereby close the outlet of the valve, to an open position wherein the gate is longitudinally displaced along the axis of the valve away from the valve to completely uncover outlet holes 181 to allow unrestricted flow from the valve outlet chamber into the insert. As desired, gate 203 may be positioned anywhere between closed and completely open positions to partially restrict flow through outlet holes 181.

Outlet holes 181 are provided rather than merely a completely open space between insert 175 and reducer 179 to ensure that gasket 205 remains properly positioned in the flange of gate 203 that traverses the holes since the gaskets are open to the inside of the gate through passages 210 so are pressurized by the pressure of the fluid in the gate. This ensures a good seal when the gate is closed, but may tend to push the gaskets from the gate flange if there is nothing to tend to hold the gasket in place. The portion of insert 175 between outlet holes 181 function to hold the gasket in place.

An inlet gate 220, similar to outlet gate 203 is mounted in the inlet portion of reducer 176 and insert 175. For this purpose, a shaft support member 221 is positioned upstream of reducer 176 and secured between an upstream pipe, not shown, and reducer 176 such as by bolts 223. Shaft support member 221 includes support arm 224 having a threaded shaft 225 extending therefrom into the inlet portion of insert 175. Gate hub 226 is mounted on shaft 225 and gate 220 is secured to hub 226 by support arms 227. Gate 220 has end flanges with gaskets 228 therein for providing good seals at each end of the gate. As with gate 203, gaskets 228 are open on the inside through channels 229 to pressurized fluid in the inlet of the reducer.

The outside circumference of gate 220 is configured to provide longitudinally extending teeth 230 which engage worm gear 231 secured to drive rod 232. As with outlet gate 203, drive rod 232 extends through the valve body and may be rotated from outside the valve body to cause rotation of gate 220 and longitudinal movement of the gate along shaft 225.

Gate 220 is shown in an open position in FIG. 14 whereby gate 220 has traveled longitudinally toward axle support 221 in an upstream direction from the valve so as to expose inlet holes 180 to allow fluid to flow from the insert into the inlet chamber of the valve. From this open position, gate 220 can be moved by rotating it so that it travels along shaft 225 to a closed position wherein it completely covers inlet holes 180. Reducer 176 and insert 175 at the inlet of the valve is shown having a length sufficient to contain gate 220 completely therein when in both open and closed conditions. Reducer 179 at the outlet of the valve is shown having a length sufficient to completely contain the outlet gate 203 only in its closed position. As gate 203 is opened, the downstream end thereof moves from inside reducer 179 into the downstream pipe or further reducer to mate with a larger downstrem pipe connected thereto, not shown. This generally is not a problem, but reducer 179 could be lengthened if desired.

In normal operation of the valve of FIG. 14, butterfly valve 182 will be closed and both inlet gate 220 and outlet gate 203 will be open. Fluid will flow in the general direction of the arrows. Flow of fluid through the valve is controlled by the elastomeric bladders as previously described. If desired, either the inlet gate 220 or outlet gate 203, or both can be set to restrict flow to some extent. If replacement of one of the bladders of the valve is necessary and it is not desired to shut off flow throught the valve, butterfly valve 182 may be opened to the extent necessary to allow desired flow at desired pressure through insert 175 around butterfly valve 182. Inlet and outlet gates 220 and 203 are closed to completely block flow of fluid through the inlet and outlet holes. In this configuration, bladders can be replaced or other repairs made to the valve, and flow continues through the valve, controlled by butterfly valve 182. This will give some pressure control, but does not provide the high degree of pressure control and regulation achieved by the valve of the invention. However, it will generally be satisfactory for short time periods. Further, since some flow through the valve takes place. The pressure against the gate seals is not as great so there is less chance of leakage. When repairs are complete, the gates are again opened and the butterfly valve closed.

If it is desired to completely stop flow of fluid through the valve, butterfly valve 182 can remain closed and gates 220 and 203 also closed.

It will be understood that with all embodiments, gaskets may be provided where needed, although not shown, such as between the valve body and the reducers and between the insert and the partition plate. Also bearings or packing glands may be added as desired to rotating parts such as the butterfly valve mounting or the various rotating shafts.

Whereas this invention is here illustrated and described with specific reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A flow control and pressure reducing valve, comprising:
   a valve body having an inlet chamber and an outlet chamber therein;
   a partition means within said valve body separating the inlet chamber and outlet chamber;
   a plurality of passage means extending through the valve body from the inlet chamber to the outlet chamber around the partition means, said passage means each being divided by the partition means into an inlet portion opening into the inlet chamber and an outlet portion opening into the outlet chamber;
   elastomeric flow control means located in said passage means and responsive to pressurized fluid introduced into said flow control means to controllably restrict said passage means;
   means for supplying pressurized fluid to said flow control means for controllably restricting each of said passage means to thereby control flow of fluid through the valve;
   an auxiliary passage extending centrally through the inlet chamber and partition means to allow flow of fluid therethrough to bypass the inlet chamber and passage means;
   valve means within the auxiliary passage to control flow of fluid through the auxiliary passage; and
   inlet gate means mounted in the auxiliary passage to control flow of fluid from the auxiliary passage into the inlet chamber of the valve.

2. A flow control and pressure reducing valve according to claim 1, wherein the valve means within the auxiliary passage is a butterfly valve.

3. A flow control and pressure reducing valve according to claim 2, wherein the butterfly valve is mounted for rotation within the auxiliary passage between open and closed positions, wherein the butterfly valve includes a semicircular rack mounted thereon with radius perpendicular to the axis of rotation of the valve, and additionally including means for controlling the rotation of the butterfly valve within the auxiliary passage, said means including gear means with said rack so that rotation of the gear means causes rotation of the butterfly valve.

4. A flow control and pressure reducing valve according to claim 3, wherein the gear means is mounted on a shaft extending from the auxiliary passage to outside the valve body so as to be rotable from outside the valve body to cause rotation of the butterfly valve.

5. A flow control and pressure reducing valve according to claim 4, wherein the shaft includes a gear shaft on which the gear is mounted, said gear shaft being mounted for rotation within the auxiliary passage, and an extension shaft extending through the valve body and coupled to the gear shaft in the auxiliary passage.

6. A flow control and pressure reducing valve according to claim 5, wherein the extension shaft is coupled to one end of the gear shaft, and the auxiliary passage includes a receiving slot for receiving the end of the gear shaft opposite said one end.

7. A flow control and pressure reducing valve according to claim 6, wherein the end of the gear shaft received by the slot is held in the slot by the interaction of the gear mounted thereon against the rack and the coupling of the extension shaft to the gear shaft.

8. A flow control and pressure reducing valve according to claim 7, wherein the extension shaft includes an enlarged portion positioned intermediate the extension shaft and outside the valve body when the extension shaft is coupled to the gear shaft, and including means to interact with the enlarged portion of the extension shaft to allow rotation thereof but to maintain the position of the extension shaft with respect to the valve body.

9. A flow control and pressure reducing valve according to claim 8, wherein the means to interact with the enlarged portion includes means abutting the enlarged portion and sandwiching it between the means to ineract and the valve body.

10. A flow control and pressure reducing valve according to claim 9, wherein the extension shaft extends from the valve body adjacent an end thereof, wherein a reducer is secured to the end of the valve body, and wherein the means to interact with the enlarged portion extends from the reducer.

11. A flow control and pressure reducing valve according to claim 5, wherein the extension shaft is coupled to one end of the gear shaft, wherein a gear shaft locating stop projects into the auxiliary passage to locate the end of the gear shaft opposite the end coupled to the extension shaft, and wherein the stop is positioned so that the end of the shaft positioned by the stop is held in position against the stop by the interaction of the gear mounted thereon against the rack and the coupling of the extension shaft to the gear shaft.

12. A flow control and pressure reducing valve according to claim 1, wherein the auxiliary passage is perforated as it passes through the inlet chamber and the inlet gate means operates to open and close said perforation.

13. A flow control and pressure reducing valve according to claim 12, wherein the inlet gate is mounted for axial travel along the auxiliary passage between a closed position wherein the inlet gate means covers the perforations and an open position wherein the inlet gate means exposes the perforations to allow flow of fluid therethrough from the auxiliary passage into the inlet chamber.

14. A flow control and pressure reducing valve according to claim 1, wherein the auxiliary passage extends through the outlet chamber of the valve, and additionally including outlet gate means mounted in the auxiliary passage to control flow of fluid from the outlet chamber of the valve into the auxiliary passage.

15. A flow control and pressure reducing valve according to claim 14, wherein the auxiliary passage is perforated as it passes through the outlet chamber and the outlet gate means operates to open and close said perforation.

16. A flow control and pressure reducing valve according to claim 15, wherein the outlet gate is mounted for axial travel along the auxiliary passage between a closed position wherein the outlet gate means covers the perforation and an open position wherein the outlet gate means exposes the perforations to allow flow of blind therethrough from the outlet chamber into the auxiliary passage.

17. A flow control and pressure reducing valve, comprising:

a valve body having an inlet chamber and an outlet chamber therein;

a partition means within said valve body separating the inlet chamber and the outlet chamber;

a plurality of passage means extending through the valve body from the inlet chamber to the outlet chamber, said passage means each having an inlet opening at one end whereby the passage opens into the inlet chamber and an outlet opening at the other end whereby the passage opens into the outlet chamber;

a first cylindrical inlet chamber sealing portion of a first diameter;

a second cylindrical inlet chamber sealing portion of a second diameter spaced axially along the inlet chamber from the first cylindrical inlet chamber sealing portion;

gate means, said gate means having a gate means first diameter portion sealingly and slidingly received in said first cylindrical inlet chamber sealing portion and a gate means second diameter portion sealingly and slidingly received in said second cylindrical inlet chamber sealing portion, the relative lengths of the gate means first diameter portion, the gate means second diameter portion, the first cylindrical inlet chamber sealing portion, and the second cylindrical inlet chamber sealing portion being such to allow the gate to move between a closed position wherein one end of the gate is adjacent the partition means and blocks flow through the inlet chamber to the inlet openings of the passages and an open position wherein the one end of the gate is moved away from the partition means to allow flow through the inlet chamber and into the inlet openings of the passages, and so that a sealed control chamber is formed between the gate means and the inlet chamber, said control chamber varying in volume as said gate means slides within the inlet chamber; and means for controlling flow of a control fluid into and out of said control chamber to control movement of the gate means within the inlet chamber.

18. A flow control and pressure reducing valve according to claim 17, wherein the one end of the gate includes a gasket which sealingly abuts the partition means when the gate is in a closed position.

19. A flow control and pressure reducing valve according to claim 17, wherein the portion of the gate toward the partition means has a pressure surface formed thereon whereby the pressure of fluid in the inlet chamber acts upon such cylindrical inlet chamber sealing portion;

gate means, said gate means having a gate means first diameter portion sealingly and slidingly received in said first cylindrical inlet chamber sealing portion and a gate means second diameter portion sealingly and slidingly received in said second cylindrical inlet chamber sealing portion, the relative lengths of the gate means first diameter portion, the gate means second diameter portion, the first cylindrical inlet chamber sealing portion, and the second cylindrical inlet chamber sealing portion being such to allow the gate to move between a closed position wherein one end of the gate is adjacent the partition means and blocks flow through the inlet chamber to the inlet openings of the passages and an open position wherein the one end of the gate is moved away from the partition means to allow flow through the inlet chamber and into the inlet openings of the passages, and so that a sealed control chamber is formed between the gate means and the inlet chamber, said control chamber varying in volume as said gate means slides within the inlet chamber; and means for controlling flow of a control fluid into and out of said control chamber to control movement of the gate means within the inlet chamber.

20. A flow control and pressure reducing valve according to claim 19, wherein the means controlling flow of a control fluid controls control fluid pressure in the control chamber to balance the pressure of the fluid flowing through the inlet chamber acting on the pressure surface.

21. A flow control and pressure reducing valve according to claim 17, wherein the inlet chamber of the valve is formed by a main valve body and a reducer secured to the main valve body, wherein the main valve body forms the first cylindrical inlet chamber sealing portion and the reducer forms the second cylindrical inlet chamber sealing portion, and wherein the second diameter is smaller than the first diameter.

22. A flow control and pressure reducing valve, comprising:

a valve body having an inlet chamber and an outlet chamber therein;

a partition means within said valve body separating the inlet chamber and the outlet chamber;

a plurality of passage means extending through the valve body from the inlet chamber to the outlet chamber, said passage means each having an inlet opening at one end whereby the passage opens into the inlet chamber and an outlet opening at the other end whereby the passage opens into the outlet chamber;

a first cylindrical outlet chamber sealing portion of a first diameter;

a second cylindrical outlet chamber sealing portion of a second diameter spaced axially along the outlet chamber from the first cylindrical outlet chamber sealing portion;

gate means, said gate means having a gate means first diameter portion sealingly and slidingly received in said first cylindrical outlet chamber sealing portion and a gate means second diameter portion sealingly and slidingly received in said second cylindrical outlet chamber sealing portion, the relative lengths of the gate means first diameter portion, the gate means second diameter portion, the first cylindrical outlet chamber sealing portion, and the second cylindrical outlet chamber sealing portion being such to allow the gate to move between a closed position wherein one end of the gate is adjacent the partition means and blocks flow through the outlet openings of the passages and the outlet chamber and an open position wherein the one end of the gate is moved away from the partition means to allow flow through the outlet openings of the passages and the outlet chamber, and so that a sealed control chamber is formed between the gate means and the outlet chamber, said control chamber varying in volume as said gate means slides within the outlet chamber; and means for controlling flow of a control fluid into and out of said control chamber to control movement of the gate means within the outlet chamber.

23. A flow control and pressure reducing valve according to claim 22, wherein the outlet chamber of the valve is formed by a main valve body and a reducer secured to the main valve body, wherein the main valve body forms the first cylindrical outlet chamber sealing portion and the reducer forms the second cylindrical outlet chamber sealing portion, and wherein the second diameter is smaller than the first diameter.

24. A flow control and pressure reducing valve according to claim 22, wherein the one end of the gate includes a gasket which sealingly abuts the partition means when the gate is in a closed position.

25. A flow control and pressure reducing valve according to claim 22, wherein the portion of the gate toward the partition means has a pressure surface formed thereon whereby the pressure of a fluid in the outlet chamber acts upon such surface to urge the gate toward open positions against the pressure of a control fluid in the control chamber.

26. A flow control and pressure reducing valve according to claim 25, wherein the means controlling flow of a control fluid controls control fluid pressure in the control chamber to balance the pressure the fluid flowing into the outlet chamber acting on the pressure surface.

* * * * *